United States Patent
Balmakhtar et al.

(10) Patent No.: US 11,516,640 B2
(45) Date of Patent: *Nov. 29, 2022

(54) WIRELESS COMMUNICATION NETWORK EXPOSURE FUNCTION (NEF) THAT INDICATES NETWORK STATUS

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: SPRINT COMMUNICATIONS COMPANY LP, Overland Park, KS (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/151,872

(22) Filed: Jan. 19, 2021

(65) Prior Publication Data

US 2021/0144531 A1 May 13, 2021

Related U.S. Application Data

(63) Continuation of application No. 16/553,519, filed on Aug. 28, 2019, now Pat. No. 10,932,108.

(51) Int. Cl.
*H04W 4/50* (2018.01)
*H04W 12/06* (2021.01)
(Continued)

(52) U.S. Cl.
CPC .......... *H04W 4/50* (2018.02); *G06F 9/45558* (2013.01); *H04L 9/0643* (2013.01); *H04W 8/08* (2013.01);
(Continued)

(58) Field of Classification Search
CPC ....... H04W 4/50; H04W 12/04; H04W 12/06; H04W 8/08; G06F 9/45558;
(Continued)

(56) References Cited

U.S. PATENT DOCUMENTS 8,688,907 B2 4/2014 Grube et al.
9,014,661 B2 4/2015 deCharms
(Continued)

FOREIGN PATENT DOCUMENTS

WO 2016161242 A1 10/2016
WO 2019001376 A1 1/2019
(Continued)

*Primary Examiner* — Habte Mered

(57) ABSTRACT

In a wireless communication network, Network Function (NF) circuitry determines an initial NF status and indicates the initial NF status to Network Exposure Function (NEF) circuitry. The NEF circuitry processes the initial NF status, and in response, determines an initial NF privilege based on the initial NF status and indicates the initial NF privilege to the NF circuitry. The NF circuitry delivers a wireless data service to a wireless User Equipment (UE) based on the initial NF privilege. The NF determines a current NF status and indicate the current NF status to the NEF circuitry. The NEF circuitry processes the current NF status, and in response, determines a current NF privilege based on the current NF status and indicates the current NF privilege to the NF circuitry. The NF circuitry delivers the wireless data service to the UE based the current NF privilege.

20 Claims, 9 Drawing Sheets

(51) Int. Cl.
  *H04W 12/04*  (2021.01)
  *H04L 9/06*  (2006.01)
  *G06F 9/455*  (2018.01)
  *H04W 8/08*  (2009.01)
  *H04L 9/00*  (2022.01)
(52) U.S. Cl.
  CPC ........... *H04W 12/04* (2013.01); *H04W 12/06* (2013.01); *G06F 2009/45587* (2013.01); *G06F 2009/45595* (2013.01); *H04L 9/50* (2022.05)
(58) Field of Classification Search
  CPC . G06F 2009/45595; G06F 2009/45587; H04L 9/0643; H04L 2209/38
  See application file for complete search history.

(56) References Cited

U.S. PATENT DOCUMENTS

| | | | |
|---|---|---|---|
| 10,582,371 B1* | 3/2020 | Abraham | ............... H04L 9/0643 |
| 2010/0122250 A1* | 5/2010 | Challener | ................. G06F 8/61 |
| | | | 718/1 |
| 2017/0332421 A1 | 11/2017 | Sternberg et al. | |
| 2018/0192390 A1 | 7/2018 | Li et al. | |
| 2018/0270778 A1* | 9/2018 | Bharatia | ................. H04L 65/80 |
| 2019/0053010 A1 | 2/2019 | Edge et al. | |
| 2019/0116486 A1 | 4/2019 | Kim et al. | |
| 2019/0251241 A1 | 8/2019 | Bykampadi et al. | |
| 2020/0053802 A1 | 2/2020 | Li et al. | |
| 2020/0146077 A1* | 5/2020 | Li | ......................... H04W 76/10 |

FOREIGN PATENT DOCUMENTS

| | | | |
|---|---|---|---|
| WO | 2019101340 A1 | 5/2019 | |
| WO | 2019118964 A1 | 6/2019 | |

* cited by examiner

000
WIRELESS COMMUNICATION NETWORK EXPOSURE FUNCTION (NEF) THAT INDICATES NETWORK STATUS

RELATED CASES

This United States Patent Application is a continuation of U.S. patent application Ser. No. 16/553,519 that was filed on Aug. 28, 2019 and is entitled "WIRELESS COMMUNICATION NETWORK EXPOSURE FUNCTION (NEF) THAT INDICATES NETWORK STATUS." U.S. patent application Ser. No. 16/553,519 is hereby incorporated by reference into this United States Patent Application.

TECHNICAL BACKGROUND

Wireless communication networks provide wireless data services to wireless user devices. Exemplary wireless data services include voice-calling, internet-access, media-streaming, machine communications, vehicle control, and social-networking. Exemplary wireless user devices comprise phones, computers, vehicles, robots, sensors, and drones. The wireless communication networks have wireless access nodes that exchange wireless signals with the wireless user devices using wireless network protocols. Exemplary wireless network protocols include Long Term Evolution (LTE) and Fifth Generation New Radio (5GNR). LTE and 5GNR are described in Third Generation Partnership Project (3GPP) technical specifications.

The wireless access nodes that serve the wireless user devices are also linked to various network elements like data gateways and mobility managers. The network elements often reside together in a core data center that is linked to several wireless access points. The core data center is typically virtualized by using hypervisors and virtual components. The virtualization maintains independence between the network element hardware and the network element software. This independence allows for convenient hardware and software replacement and also enables efficient load balancing and resource utilization.

The European Telecommunication Standards Institute (ETSI) issues publications that describe the virtualization of network element hardware and that details the virtualized execution of the network element software. The network element hardware and lower level software is referred to as a Network Function Virtualization Infrastructure (NFVI). The higher level network element software is referred to as Virtual Network Functions (VNFs). The NFVI executes the VNFs to form various network elements.

One of the VNFs comprises an Application Function (AF). The AF interacts with a network operator and with other VNFs to enable network operations like provisioning and isolation. AFs monitor VNF status and exert application-layer network control. For example, an AF may track the status of a Policy Control Function (PCF) and periodically provision the PCF. Another one of the VNFs comprises a Network Exposure Function (NEF). The NEF interacts with VNFs to advertise their existence and their capabilities to the network at large. For example, the NEF may expose contact information for an Access and Mobility Management Function (AMF) to various wireless access nodes and VNFs.

Unfortunately, the current NEFs do not efficiently and effectively monitor and control VNFs in an NFVI. Moreover, the current NEFs do not enable the AFs to effectively interact with the VNFs through the NEF.

TECHNICAL BACKGROUND

In a wireless communication network, Network Function (NF) circuitry determines an initial NF status and indicates the initial NF status to Network Exposure Function (NEF) circuitry. The NEF circuitry processes the initial NF status, and in response, determines an initial NF privilege based on the initial NF status and indicates the initial NF privilege to the NF circuitry. The NF circuitry delivers a wireless data service to a wireless User Equipment (UE) based on the initial NF privilege. The NF determines a current NF status and indicate the current NF status to the NEF circuitry. The NEF circuitry processes the current NF status, and in response, determines a current NF privilege based on the current NF status and indicates the current NF privilege to the NF circuitry. The NF circuitry delivers the wireless data service to the UE based the current NF privilege.

DETAILED DESCRIPTION

Figure 1:
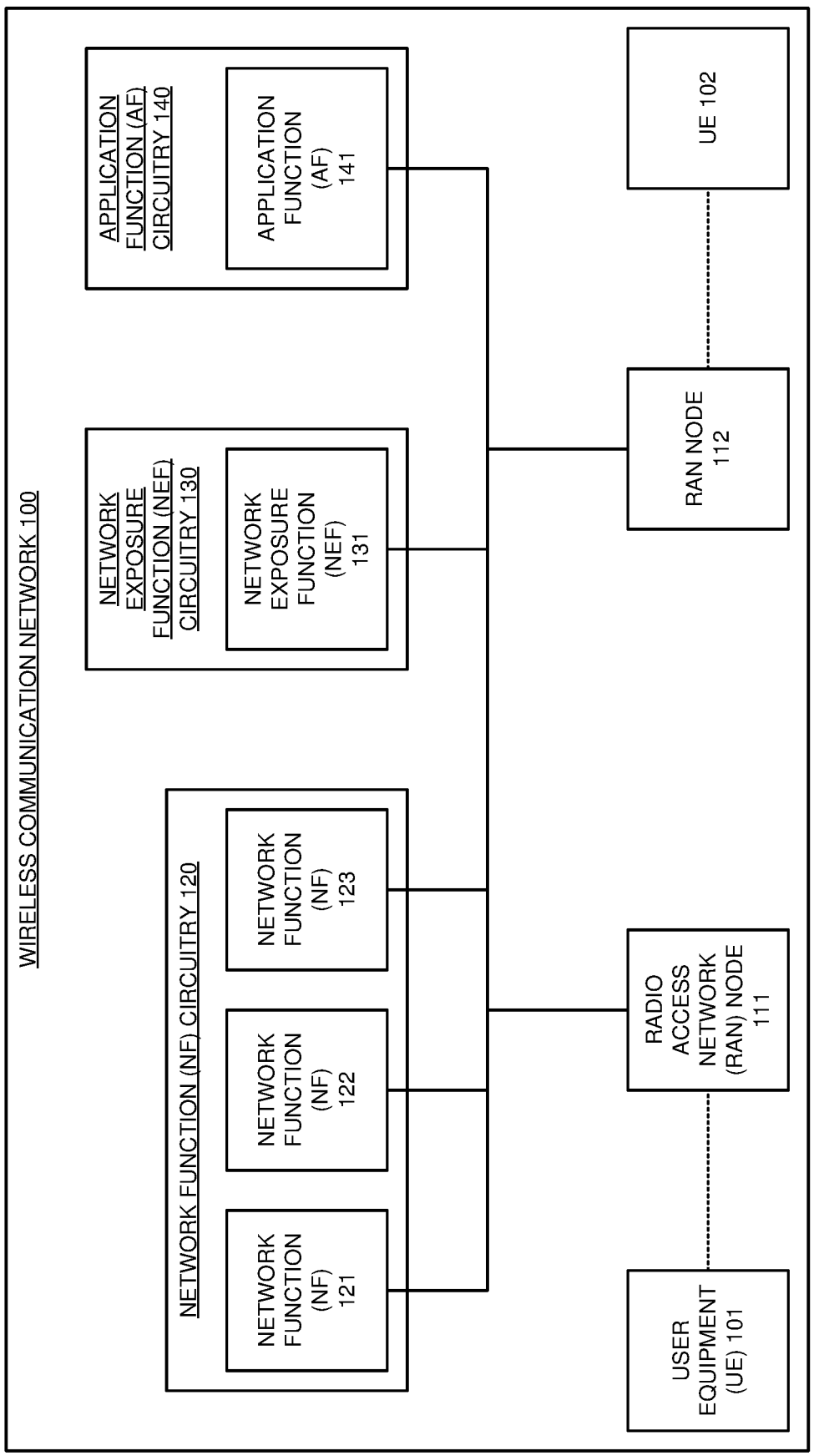
FIG. 1 illustrates a wireless communication network to serve User Equipment (UEs) with wireless communication services and comprising a Network Exposure Function (NEF) to indicate network status.

FIG. 1 illustrates wireless communication network 100 to serve User Equipment (UEs) 101-102 with wireless communication services and indicate network status. Wireless communication network 100 comprises User Equipment (UEs) 101-102, Radio Access Network (RAN) nodes 111-112, Network Function (NF) circuitry 120, Network Exposure Function (NEF) circuitry 130, and Application Function (AF) circuitry 140. NF circuitry 120 comprises NFs 121-123. NEF circuitry 130 comprises NEF 131. AF circuitry 140 comprises AF 141. UEs 101-102 are wirelessly linked to respective RAN nodes 111-112. RAN nodes 111-112 are linked to NF circuitry 120, NEF circuitry 130, and AF circuitry 140. NF circuitry 120, NEF circuitry 130, and AF circuitry 140 are linked to one another and may share some components. Wireless communication network 100 is restricted for clarity and typically includes more UEs, RAN nodes, circuitries, and functions than the amount shown.

UEs 101-102 comprise user circuitry that interacts with users. UEs 101-102 also comprise radio circuitry that wirelessly communicates with RAN nodes 111-112. UEs 101-

102 might be phones, computers, robots, sensors, vehicles, drones, data appliances, or some other user apparatus with wireless communication circuitry. In some examples, UEs 101-102 include NFs and/or AFs that interact with NEF 131 as described herein.

RAN nodes 111-112 comprise antennas, modulators, amplifiers, filters, digital/analog interfaces, microprocessors, memory, software, transceivers, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memory comprises Random Access Memory (RAM), flash circuitry, disk drives, and/or the like. The memory stores software like operating systems, network applications, and virtual components. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used. The microprocessors execute the operating systems and network applications to wirelessly exchange network signaling and user data with UEs 101-102 over wireless links. The microprocessors execute the operating systems and network applications to exchange network signaling and user data with NF circuitry 120. In some examples, RAN nodes 111-112 include NFs and/or AFs that interact with NEF 131 as described herein.

NF circuitry 120, NEF circuitry 130, and AF circuitry 140 comprise microprocessors, memory, software, transceivers, and bus connections. The microprocessors comprise CPUs, GPUs, ASICs, and/or the like. The memory comprises RAM, flash circuitry, disk drives, and/or the like. The memory stores software like operating systems, virtual components, and functions 121-123, 131, and 141. NFs 121-123 may comprise: Software Defined Network (SDN) applications, Access and Mobility Management Functions (AMFs), Session Management Functions (SMFs), Policy Control Functions (PCFs), Authentication Server Functions (AUSFs), Network Slice Selection Functions (NSSFs), Unified Data Functions (UDMs), Network Repository Functions (NRFs), Internet Protocol Multimedia Subsystem Functions (IMSF), and/or some other type of networking software. NEF 131 may comprise a Software Defined Network (SDN) controller and distributed ledger and/or some other type of control software. AF 141 may comprise a Software Defined Network (SDN) application and/or some other type of application software. In some examples, some or all of circuitry 120, 130, and 140 resides in a Network Function Virtualization Infrastructure (NFVI).

UEs 101-102 and RAN nodes node 111-112 wirelessly exchange network signaling and user data over wireless links. The wireless links may use Institute of Electrical and Electronic Engineer (IEEE) 802.11 (WIFI), Long Term Evolution (LTE), Fifth Generation New Radio (5GNR), Narrowband Internet-of-Things (NB-IoT), or some other wireless protocol. LTE, 5GNR, and NB-IoT are described by Third Generation Partnership Project (3GPP) Technical Specifications. WIFI, LTE, 5GNR, and NB-IoT may use frequencies in the low-band, mid-band, millimeter-wave band, and/or some other part of the wireless spectrum. RAN nodes 111-112 and NF circuitry 120 exchange network signaling and user data over the network links. NF circuitry 120 exchanges network signaling and user data with external systems. The network links may use IEEE 802.3 (Ethernet), Data Over Cable System Interface Specification (DOCSIS), Internet Protocol (IP) LTE, 5GNR, or some other data protocol.

NF circuitry 120 executes operating systems, virtual components and NFs 121-123. NEF 130 circuitry executes operating systems, virtual components, and NEF 131. AF circuitry 140 executes operating systems, virtual components, and AF 141. In some examples, circuitry 120, 130, and 140 share components like CPUs, transceivers, memory, operating systems, and/or virtual switches.

NEF 131 is configured with a data structure that correlates NF Identifiers (IDs), NF status, and possibly other data into NF privileges. For example, NF 121 may get a default privilege set on its initial contact with NEF 131, and then NEF 131 would add privileges as NF 121 reports more status information. NEF may also revoke privileges based on NF ID, status, and other data. NF 121 and NEF 131 are each configured with hash algorithms, NF ID, and NEF ID. NF 121 hashes its NF ID with a random number (RAND). NF 121 transfers the NF ID hash and the RAND to NEF 131. NEF 131 receives and decodes the NF ID hash using the RAND and its hash algorithm. NEF 131 authenticates NF 121 when NEF 131 decodes the NF ID hash to the stored version of the NF ID.

After authentication, NEF 131 identifies network privileges for NF 121 like network exposure, NF contact, AF contact, RAN contact, UE contact, service start, and/or the like. The privileges for NF 121 typically start small and grow over time. NEF 131 hashes the selected NF privileges for NF 121. For example, NEF 131 may hash a network exposure privilege and a NF status privilege with RANDs where the exposure and status privileges allow NF 121 to advertise itself to others and to distribute status information through NEF 131. NEF 131 transfers the exposure and status privilege hashes and RANDs to NF 121.

NF 121 receives and decodes the NF exposure and status privilege hashes to identify the exposure and status privileges. In response to the status privilege, NF 121 selects at least one NF key that characterizes its current operational situation. Current NF status can take various forms like NF on/off, NF capacity, service on/off, service metrics, or some other NF operational descriptors. NF 121 hashes its NF ID and the selected NF status keys with RANDs. NF 121 transfers the NF ID hash, NF status hashes, and RANDs to NEF 131.

NEF 131 receives and decodes the NF ID hash to authenticate NF 121 and the NF status hash to select privileges. After authentication, NEF 131 identifies privileges for NF 121. NEF 131 hashes and transfers the privileges to NF 121. NF 121 receives, decodes, and uses the additional privileges. NEF 131 receives and stores the NF status key hashes—typically in a distributed ledger. Typically, NEF 131 does not store the NF status keys in the clear.

NFs 122-123 interact with NEF 131 in a similar manner. Subsequently, UEs 101-102 exchange network signaling and user data over RAN nodes 111-112 and NFs 121-123. RAN nodes 111-112 and NFs 121-123 deliver wireless data services to UEs 101-102 like social networking, media-streaming, media-conferencing, machine control, NB-IoT, or some other user application.

NEF 131 is configured with a data structure that correlates AF IDs, AF status, and possibly other data into AF privileges. For example, AF 141 may get a default privilege set on its initial contact with NEF 131, and then NEF 131 would add privileges as AF 141 reports more status information. NEF 131 may also revoke privileges based on AF ID, status, and other data. AF 141 and NEF 131 are each configured with hash algorithms, AF ID, and NEF ID. AF 141 hashes its AF ID with a RAND and transfers the AF ID hash and RAND to NEF 131. NEF 131 receives and decodes the AF ID hash using the RAND and its hash algorithm. NEF 131 authenticates AF 141 in response to decoding an AF ID that matches the stored and expected value.

After authentication, NEF 131 identifies privileges for AF 141. For example, NEF 131 may identify a status privilege for AF 141 to obtain status information about NFs 121-123. The privileges for AF 141 typically start small and grow over time. NEF 131 hashes the privileges for AF 141 and transfers the privilege hashes and RANDs to AF 141. AF 141 receives and decodes the privilege hashes to identify the privileges. In response to the status privilege, AF 141 hashes it's AF ID and a status request for NFs 121-123 and transfers the ID hash, status request hash, and RANDs to NEF 131. NEF 131 receives and decodes the NF ID hash to authenticate AF 141. NEF 131 receives and decodes the NF status request hash to identify the status request. After authentication, NEF 131 identifies, hashes, and transfers privileges to AF 141 based on the AF ID, status, and possibly other data. AF 141 receives, decodes, and uses the privileges. For example, NEF 131 may grant a provisioning privilege to AF 141 to provision NFs 121-123. In response to the NF status request, NEF 131 identifies the current status hashes and RANDs for NFs 121-123. NEF 131 transfers the current status hashes and RANDs for NFs 121-123 to AF 141. AF 141 receives and decodes the current status hashes for NFs 121-123 using the RANDs to discover current network status.

AF 141 receives and decodes a provisioning privilege hash to identify the provisioning privilege for NFs 121-123. In response to the provisioning privilege, AF 141 hashes its AF ID and provisioning data for NF 122 and transfers the AF ID hash, provisioning data hash, and RANDs to NEF 131. NEF 131 receives and decodes the NF ID hash to authenticate AF 141. After authentication, NEF 131 identifies, hashes, and transfers privileges to AF 141. For example, NEF may grant an isolation privilege to AF 141 for NFs 121-123. AF 141 receives, decodes, and uses the additional privileges. In response to the NF provisioning data hash for NF 122, NEF 131 decodes and identifies the NF provisioning data for NF 122 per the provisioning privilege granted to AF 141. Based on the authentication and the privilege for AF 141, NEF 131 transfers the provisioning hash and RAND to NF 122. NF 122 receives and decodes the NF provisioning data hash. NF 122 installs and uses the provisioning data.

AF 141 receives and decodes an isolation privilege hash to identify an isolation privilege for NFs 121-123. In response to the isolation privilege, AF 141 hashes its AF ID and isolation instruction for NF 123 and transfers the AF ID hash, isolation hash, and RANDs to NEF 131. NEF 131 receives and decodes the AF ID hash to authenticate AF 141. After authentication, NEF 131 identifies, hashes, and transfers privileges to AF 141. AF 141 receives, decodes, and uses the additional privileges. In response to the NF isolation hash for NF 123, NEF 131 decodes and identifies the NF isolation instruction for NF 123 per the isolation privilege granted to AF 141. Based on the authentication and the isolation privilege for AF 141, NEF 131 hashes and transfers no contact instructions for NF 123 to the other NFs that have contact privileges for NF 123. NEF 131 also stops exposing NF 123 on the network.

Figure 2:
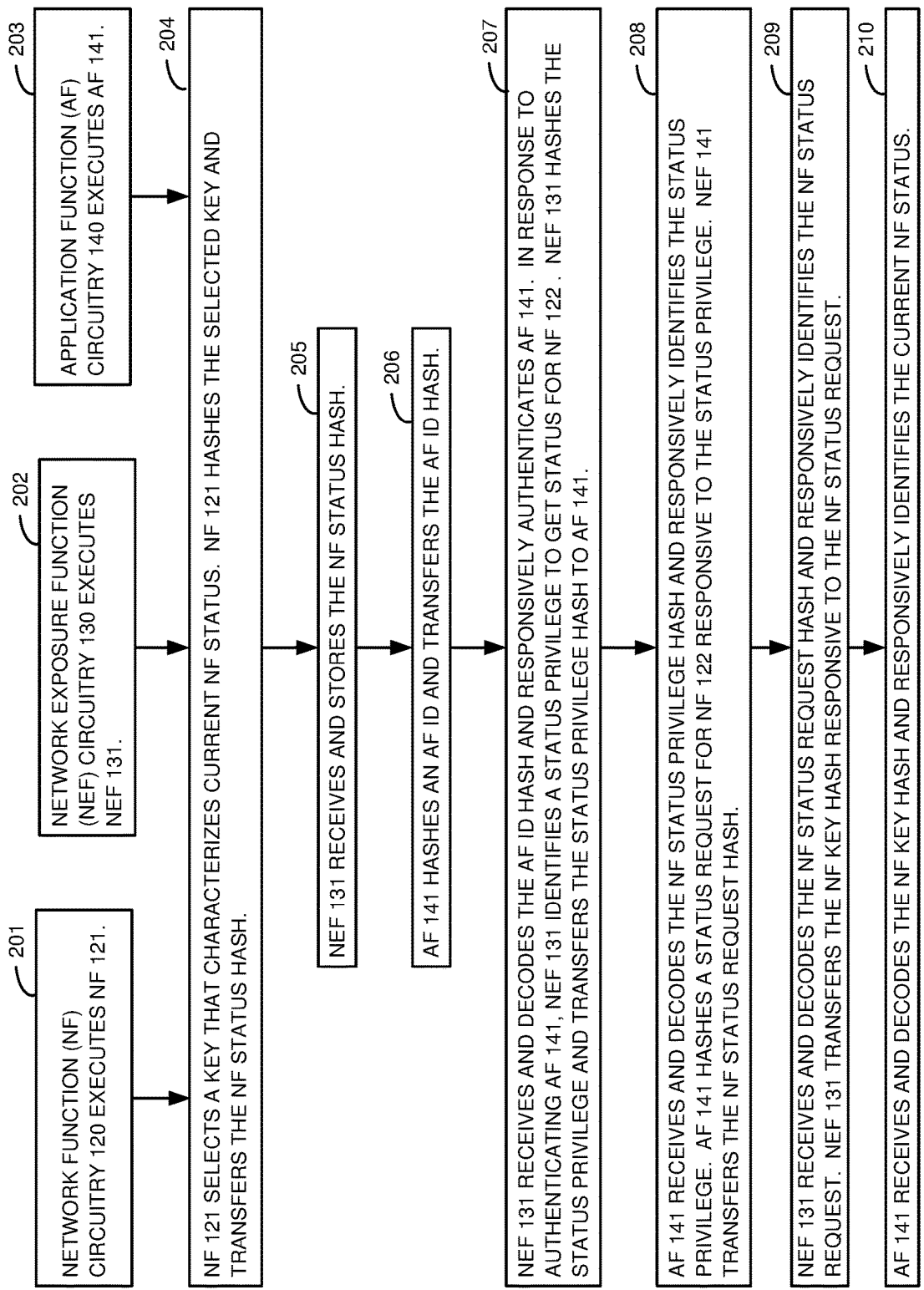
FIG. 2 illustrates the operation of the wireless communication network to serve the UEs with wireless communication services and indicate network status.

FIG. 2 illustrates the operation of wireless communication network 100 to serve UEs 101 with the wireless communication services and indicate the network status. NF circuitry 120 executes NF 121 (201). NEF 130 circuitry executes NEF 131 (202). AF circuitry 140 executes AF 141 (203). NF 121 selects a key that characterizes its current NF status (204). For example, the NF status could be "NF start-up complete and all services off" or the like. NF 121 hashes the selected NF status key and transfers the NF status hash (204). NEF 131 receives and stores the NF status hash (205). AF 141 hashes its AF ID and transfers the AF ID hash and RAND to NEF 131 (206). NEF 131 receives and decodes the AF ID hash to authenticate AF 141 (207). NEF 131 identifies a status privilege for AF 141 to get the status of NF 122 (207). NEF 131 hashes the status privilege and transfers the status privilege hash and RAND to AF 141 (207). AF 141 receives and decodes the status privilege hash to identify the status privilege to get the status of NF 122 (208). In response to the status privilege, AF 141 hashes a status request for NF 122 and transfers the status request hash and RAND to NRF 131 (208). NEF 131 receives and decodes the NF status request hash to identify the status request for NF 122 (209). In response, NEF 131 identifies the current status hash and RAND for NF 122 (209). NEF 131 transfers the current status hash and RAND for NF 122 to AF 141 (209). AF 141 receives and decodes the current status hash for NF 122 to identify current NF status (210).

Figure 3:
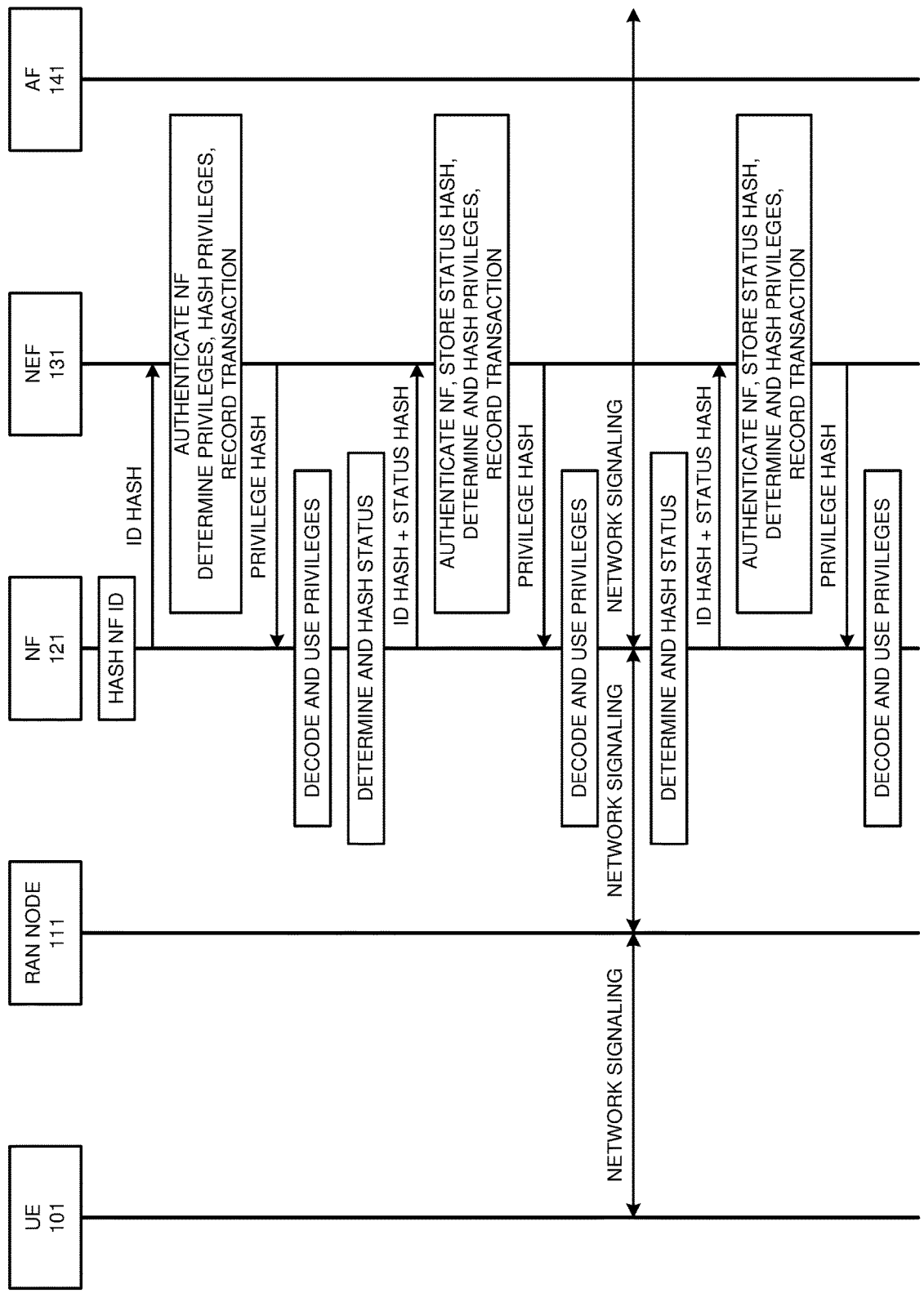
FIG. 3 illustrates the operation of the wireless communication network to serve the UEs with wireless communication services and indicate network status.
Figure 4:
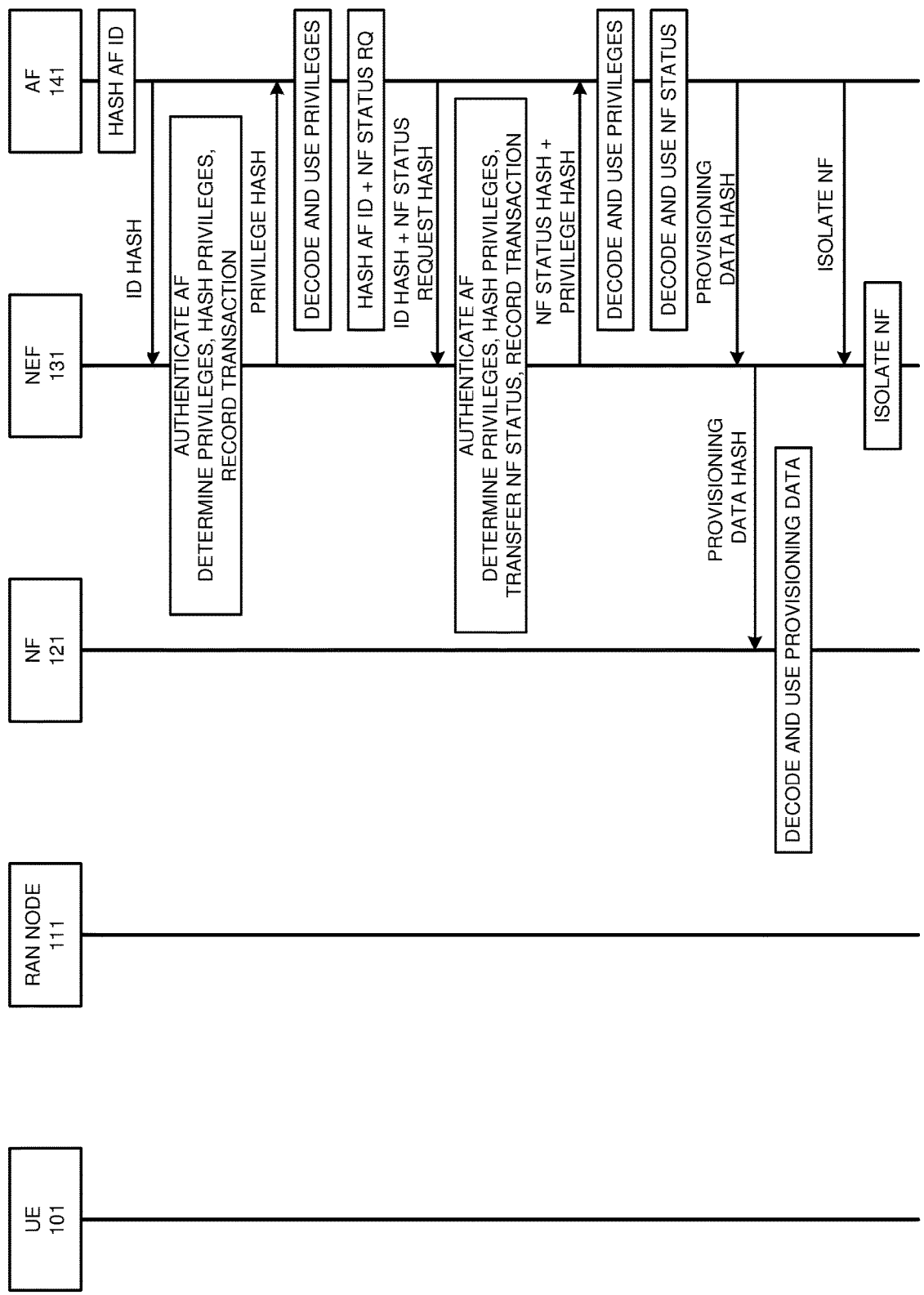
FIG. 4 illustrates the operation of the wireless communication network to serve the UEs with wireless communication services and indicate network status.

FIGS. 3-4 illustrate the operation of wireless communication network 100 to serve UE 101 with the wireless communication services and indicate the network status. Referring to FIG. 3, NF 121 hashes NF ID and transfers the NF ID hash to NEF 131. NEF 131 decodes the NF ID hash to authenticate NF 121. NEF 131 identifies privileges for authenticated NF 121 and hashes the privileges for NF 121. NEF 131 transfers the NF privilege hash to NF 121. NEF 131 records the transaction.

NF 121 receives and decodes the NF privilege hash to identify and use the NF privileges. In response to the NF privileges, NF 121 determines a key that characterizes its current NF status. NF 121 hashes its NF ID and selected status key. NF 121 transfers the NF ID hash and the NF status hash to NEF 131.

NEF 131 decodes the NF ID hash to authenticate NF 121. NEF 131 stores the NF status hash—typically in a distributed ledger. NEF 131 identifies privileges for NF 121. NEF 131 hashes the privileges and transfers the privilege hash to NF 121. NF 121 decodes and uses the privileges. NEF 131 records the transaction.

At this point, NF 121 exchanges network signaling with RAN node 111 and with external systems. RAN node 111 exchanges network signaling with UE 101. In response to the NF privileges, NF 121 determines another key that characterizes its current NF status. NF 121 hashes its NF ID and the selected NF status key. NF 121 transfers the NF ID hash and NF status hash to NEF 131. NEF 131 decodes the NF ID hash to authenticate NF 121. NEF 131 stores the new NF status hash. NEF 131 identifies privileges for NF 121. NEF 131 hashes the privileges and transfers privilege hash to NF 121. NF 121 decodes the privilege hash and uses the privileges.

Referring to FIG. 4, AF 141 hashes its AF ID and transfers the AF ID hash to NEF 131. NEF 131 decodes the AF ID hash to authenticate AF 131. NEF 131 identifies privileges for AF 141. For example, AF 141 may have the privilege to obtain status information for NF 121. NEF 131 hashes the privileges for AF 141. NEF 131 transfers the privilege hashes to AF 141. NEF 131 records the transaction.

AF 141 decodes the privilege hashes and identifies the status privilege for NF 121. In response to the status privilege, AF 141 hashes its AF ID and a status request for NF 121 and transfers the AF ID hash and the status request hash to NEF 131. NEF 131 decodes the AF ID hash to authenticate AF 141. NEF 131 determines new privileges like provisioning and isolation for NF 121. NEF 131 hashes and transfers the new privileges. NEF 131 decodes the status request hash to identify the status request for NF 121. In response to the status request, NEF 131 identifies the current status hash for NF 121. NEF transfers the current status hash for NF 121 to AF 141. NEF 131 records the transaction.

AF 141 receives and decodes the current status hash for NF 121 to discover and use the current NF status. AF 141 also decodes the provisioning privilege hash to identify the provisioning privilege. In response to the provisioning privilege, AF 141 hashes its AF ID and provisioning data for NF 121 and transfers the AF ID hash and provisioning hash to NEF 131. NEF 131 decodes the AF ID hash to authenticate AF 141. NEF 131 decodes the provisioning hash to identify the provisioning data. After authentication, NEF 131 transfers the provisioning data hash to NF 121. NF 121 decodes the NF provisioning data hash to identify the provisioning data. NEF 121 installs and uses the provisioning data.

AF 141 also decodes the isolation privilege hash to identify the isolation privilege. In response to the isolation privilege, AF 141 hashes its AF ID and an isolation instruction for NF 121. AF 141 transfers the AF ID hash and the isolation hash to NEF 131. NEF 131 decodes the AF ID hash to authenticate AF 141. After authentication, NEF 131 decides the isolation hash to identify the isolation instruction for NF 121. In response, NEF 131 isolates NF 121 by stopping exposure and signaling other NFs to stop contact with NF 121.

Advantageously, wireless communication network 100 features NEF 131 that serves network status information to AF 141. Moreover, NEF 131 enables AF 141 to effectively interact with NFs 121-123 for tasks like network status, provisioning, isolation, or some other network operation.

Figure 5:
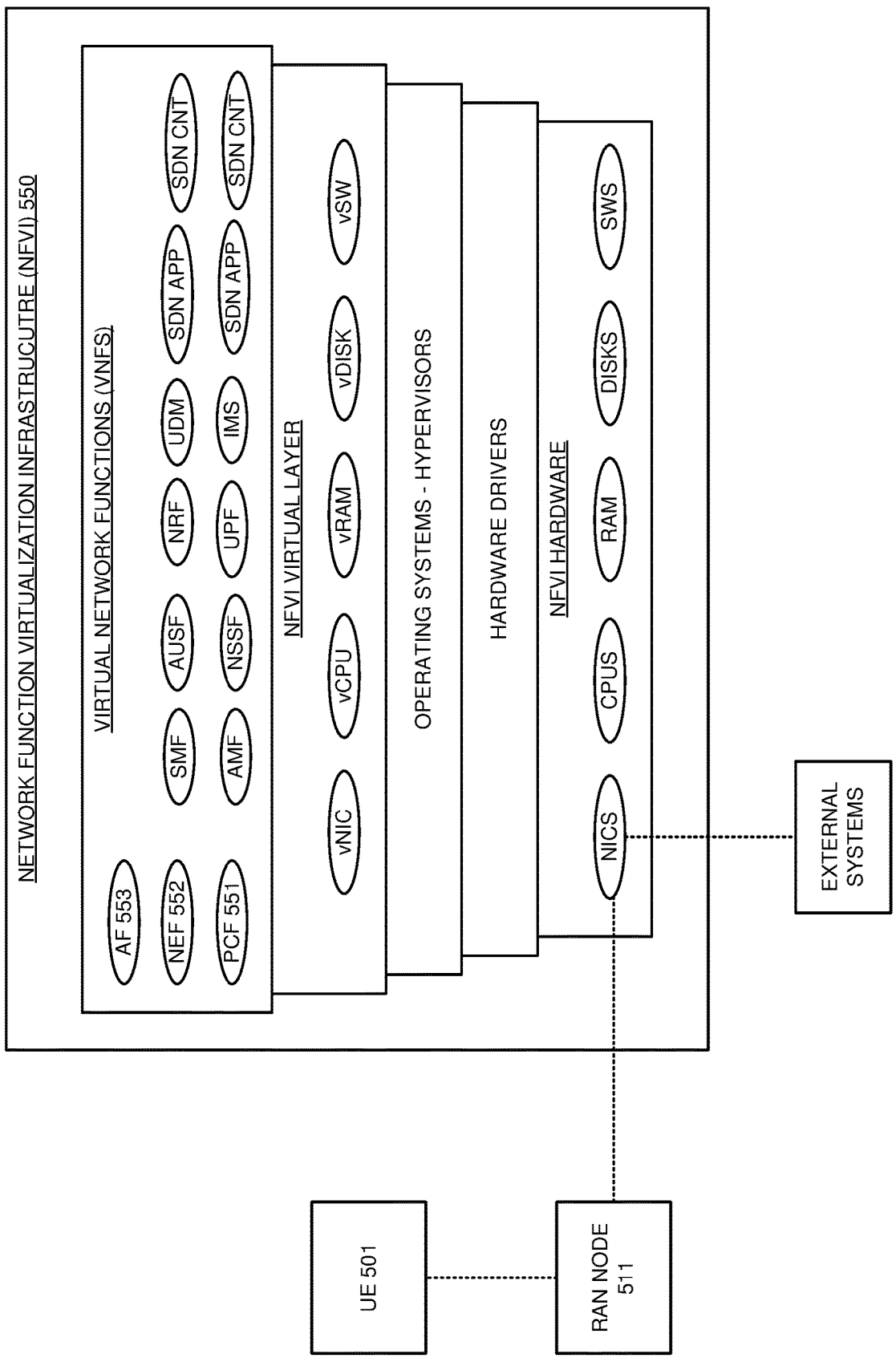
FIG. 5 illustrates a Network Function Virtualization Infrastructure (NFVI) to serve the UEs with wireless communication services and comprising a Network Exposure Function (NEF) to indicate network status.

FIG. 5 illustrates Network Function Virtualization Infrastructure (NFVI) 550 to serve UE 501 with wireless communication services. NFVI 550 comprises Network Exposure Function (NEF) 552 to indicate Virtual Network Function (VNF) status to Application Function (AF) 553. NFVI 550 is an example of NF circuitry 120, NEF circuitry 130, and AF circuitry 140, although circuitry 120, 130, and/or 140 may differ. NFVI 550 comprises NFVI hardware, hardware drivers, operating systems and hypervisors, NFVI virtual layer, and Virtual Network Functions (VNFs). The NFVI hardware comprises Network Interface Cards (NICs), CPUs, RAM, disk storage, and data switches (SWS). The virtual layers comprise virtual NICs (vNIC), virtual CPUs (vCPU), virtual RAM (vRAM), virtual Disk Storage (vDISK), and virtual Switches (vSW). The VNFs comprise Policy Control Function (PCF) 551, NEF 552, and AF 553. The VNFs also include Access and Mobility Management Function (AMF), Session Management Function (SMF), Authentication and Security Function (AUSF), Unified Data Management (UDM), Network Slice Selection Function (NSSF), Network Repository Function (NRF), Internet Protocol Multimedia Subsystem (IMS), User Plane Function (UPF), Software Defined Network (SDN) application (APP), SDN controller (CNT), or some other network functions. The NFVI hardware executes the hardware drivers, operating systems/hypervisors, virtual layers, and VNFs to serve UE 501 over RAN node 511.

The VNFs are each configured with hash algorithms, IDs, status keys, and NEF interfaces. The VNFs hash their IDs with RANDS and transfer the hashes and RANDS to NEF 552. NEF 552 receives and decodes the VNF ID hashes using the RANDS to authenticate the VNFs by matching decodes VNF IDs with stores and expected VNF IDs. After VNF authentication, NEF 553 identifies privileges for the VNFs like network exposure, contact information, and service instructions. NEF 553 hashes the selected privileges for the VNFs with RANDs and transfers the status privilege hashes and RANDs to the VNFs. The VNFs receive and decode their own privilege hashes to identify their network privileges.

In response to a status privilege for PCF 551, PCF 551 selects a key that characterizes its current operational situation like "PCF ON, SERVICE A at 80% capacity". PCF 551 hashes its ID and the selected status key and transfers the PCF ID hash, PCF status hash, and RANDs to NEF 552. NEF 552 receives and decodes the PCF ID hash to authenticate PCF 551. NEF 552 receives and decodes the PCF status hash to select privileges. After authentication, NEF 552 identifies any additional privileges for PCF 551. NEF 552 hashes and transfers the additional privileges to PCF 551. PCF 551 receives, decodes, and uses the additional privileges.

AF 553 hashes its AF ID and transfers the AF ID hash and RAND to NEF 552. NEF 552 receives and decodes the AF ID hash. NEF 552 authenticates AF 553 in response to decoding and matching the AF ID. After authentication, NEF 552 identifies privileges for AF 553. For example, NEF 552 may identify a PCF status privilege for AF 553. NEF 553 hashes the PCF status privilege for AF 553 and transfers the status privilege hash and RAND to AF 553. AF 553 receives and decodes the status privilege hash to identify the PCF status privilege for PCF 551. In response to the status privilege, AF 553 hashes and transfers the AF ID and a status request for PCF 551 along with the RANDs. NEF 552 receives and decodes the AF ID hash to authenticate AF 553. After authentication, NEF 553 identifies, hashes, and transfers any new privileges to AF 553. AF 553 receives, decodes, and uses the new privileges. In response to the PCF status request hash for PCF 551, NEF 553 identifies the current status hash and RAND for PCF 551. NEF 552 transfers the current status hash and RAND for PCF 551 to AF 553. AF 553 receives and decodes the current status hash for PCF 531 to discover and act on the current PCF status. AF 553 may obtain and use other privileges for VNFs in a similar manner. For example, AF 553 may obtain provisioning and isolation privileges for PCF 551. In another example, AF 553 may obtain contact privileges for the NRF and UDM.

In some examples, the SDN controller performs authentication, privilege distribution, and privilege execution in the manner described for NEF 553. In these examples, the SDN controller performs VNF authentication, VNF privilege distribution, and supports the execution of VNF privileges like provisioning and isolation. Although the SDN controller could interact with various VNFs, the SDN controller typically performs authentication, privilege distribution, and privilege execution for the SDN applications and the other SDN controllers.

RAN nodes 511-512 and/or UEs 501 may obtain and use privileges in a similar manner. AF 553 may obtain and use privileges for RAN nodes 511-512 and/or UEs 501 like status, provisioning, network contact, and isolation. For example, AF 553 may obtain provisioning privileges for RAN node 511 and obtain isolation privileges for UE 501.

Figure 6:
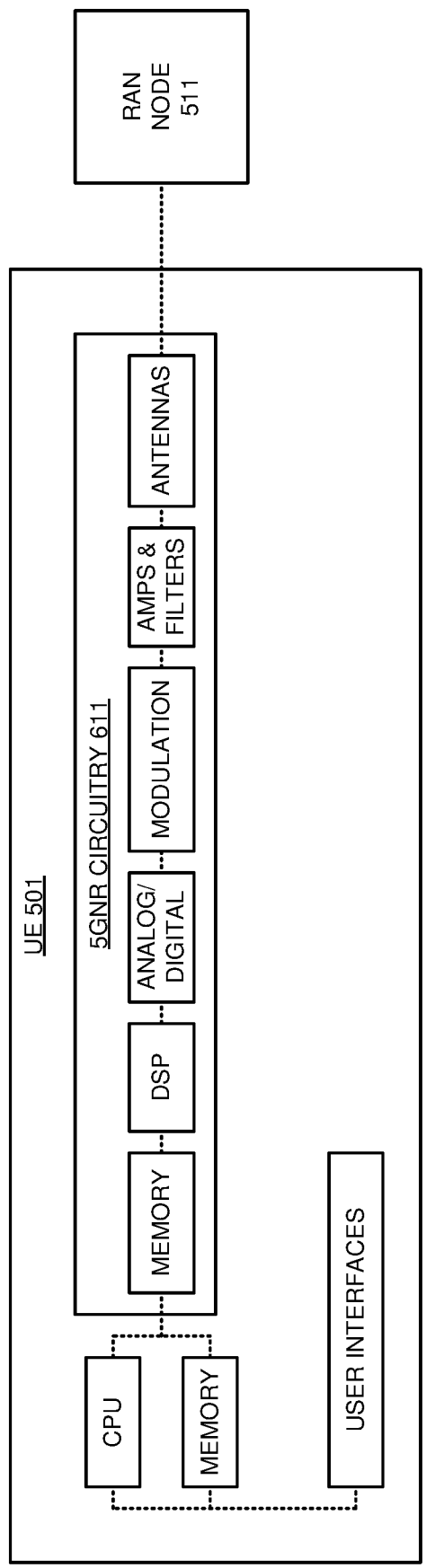
FIG. 6 illustrates a UE that is served with wireless communication services by the NFVI that comprises the NEF to indicate network status.

FIG. 6 illustrates UE 501 that is served with wireless communication services by Radio Access Network (RAN) node 511 and NFVI 550. NFVI 550 also indicates network status. UE 501 is an example of UEs 101-102, although UEs 101-102 may differ. UE 501 comprises Fifth Generation New Radio (5GNR) circuitry 611, CPU, memory, and user interfaces which are interconnected over bus circuitry. 5GNR circuitry 611 comprises antennas, amplifiers, filters, modulation, analog-to-digital interfaces, DSP, and memory that are coupled over bus circuitry. The antennas in UE 501 are coupled to RAN node 511 over wireless 5GNR links. The user interfaces comprise graphic displays, machine controllers, sensors, cameras, transceivers, and/or some other user components. The memories store operating systems, user applications, and network applications. The network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). The CPU executes the operating systems, user applications, and network applications to exchange network signaling and user data with RAN node 511 over 5GNR circuitry 611 and the 5GNR links.

The RRC exchanges user signaling with the user applications. The SDAP exchanges user data with the user applications. The RRC processes the user signaling and downlink RRC/N1 signaling to generate downlink user signaling and uplink RRC/N1 signaling. The SDAP exchanges user data with the user applications. The SDAP processes the uplink user data to generate uplink SDAP data and processes downlink SDAP data to generate downlink user data.

The RRC maps between the RRC/N1 signaling and Service Data Units (SDUs). The SDAP maps between the SDAP data SDUs. The RRC and SDAP exchanges their SDUs with the PDCP. The PDCP maps between the SDUs and PDUs. The PDCP exchanges the PDUs with the RLC. The RLC maps between the PDUs and MAC logical channels. The RLC exchanges the network signaling and user data with the MAC over the MAC logical channels. The MAC maps between the MAC logical channels and MAC transport channels. The MAC exchanges the network signaling and user data with the PHYs over the MAC transport channels. The PHYs maps between the MAC transport channels and PHY transport channels. The PHY exchanges the 5GNR RRC signaling and 5GNR SDAP data with the PHYs in the RAN node 511 over the PHY transport channels in the 5GNR wireless links.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 501 may obtain and use privileges like network exposure, status, provisioning, contact, and isolation as described herein. The 5GNR RRC in UE 501 interacts with NEF 553 in NFVI 550 to authenticate, obtain privileges, and execute the privileges. For example, the 5GNR RRC in UE 501 may obtain privileges for UE exposure and status distribution.

Figure 7:
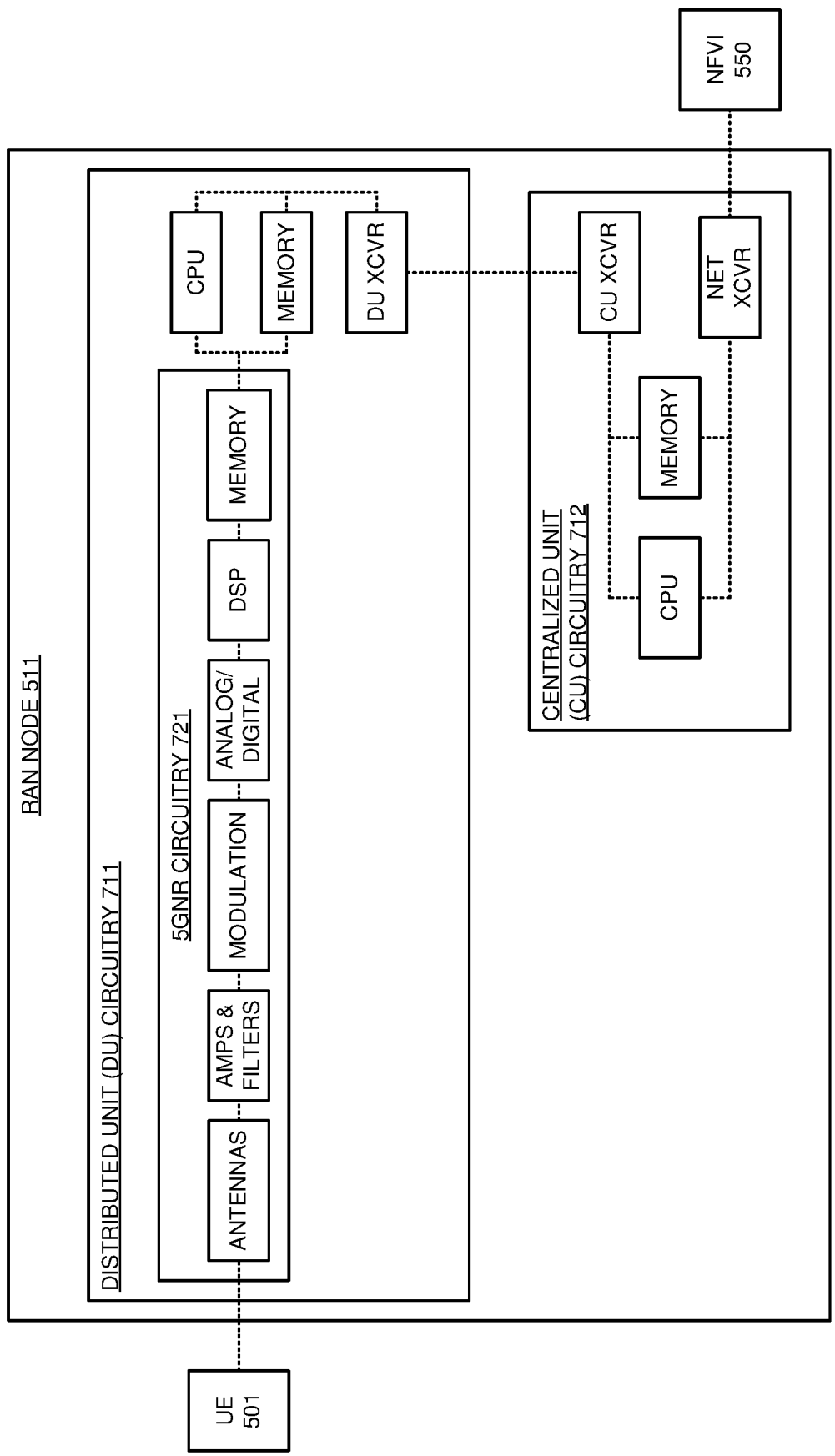
FIG. 7 illustrates a Radio Access Network (RAN) node to serve the UE with wireless communication services with the NFVI that comprises the NEF to indicate network status.

FIG. 7 illustrates RAN node 511 to serve UE 501 with the wireless communication services along with NFVI 550 that has the NEF to indicate network status. RAN node 511 is an example of RAN nodes 111-112, although nodes 111-112 may differ. RAN node 511 comprises Distributed Unit (DU) circuitry 711 and Centralized Unit (CU) circuitry 712. DU circuitry 711 comprises 5GNR circuitry 721, Central Processing Units (CPU), memory, and transceivers (DU XCVR) that are coupled over bus circuitry. 5GNR circuitry 721 comprises antennas, amplifiers (AMPS), filters, modulation, analog-to-digital interfaces, Digital Signal Processors (DSP), and memory that are coupled over bus circuitry. CU circuitry 712 comprises CPU, memory, and transceivers that are coupled over bus circuitry. UE 501 is wirelessly coupled to the antennas in 5GNR circuitry 721 over wireless 5GNR links. The DU transceivers in DU circuitry 711 are coupled to the CU transceivers in CU circuitry 712 over network data links. The network transceivers in CU circuitry 712 are coupled to NFVI 550 over network data links.

In DU circuitry 711, the memories store operating systems and network applications. The network applications include at least some of: PHY, MAC, RLC, PDCP, RRC, and SDAP. In CU circuitry 712, the memories store operating systems, virtual components, and network applications. The virtual components comprise hypervisor modules, virtual switches, virtual machines, and/or the like. The network applications comprise at least some of: PHY, MAC, RLC, PDCP, RRC, and SDAP.

The CPU in CU circuitry 712 executes some or all of the 5GNR network applications to drive the transfer of 5GNR data from NFVI 550 to DU circuitry 711. The CPU in DU circuitry 711 executes some or all of the 5GNR network applications to drive the transfer of 5GNR data from CU circuitry 712 to UE 501. The functionality split of the 5GNR network applications between DU circuitry 711 and CU circuitry 712 may vary.

The RRC exchanges N2 signaling with the AMF VNF in NFVI 550. The SDAP exchanges N3 data with the UPF in NFVI 550. The RRC maps between the N2 signaling and Service Data Units (SDUs). The SDAP maps between the N3 data SDUs. The RRC and SDAP exchanges their SDUs with the PDCP. The PDCP maps between the SDUs and PDUs. The PDCP exchanges the PDUs with the RLC. The RLC maps between the PDUs and MAC logical channels. The RLC exchanges the network signaling and user data with the MAC over the MAC logical channels. The MAC maps between the MAC logical channels and MAC transport channels. The MAC exchanges the network signaling and user data with the PHYs over the MAC transport channels. The PHYs maps between the MAC transport channels and PHY transport channels. The PHY exchanges the 5GNR RRC signaling and 5GNR SDAP data with the PHYs in the UE 501 over the PHY transport channels in the 5GNR wireless links.

RAN Node 511 may obtain and use privileges like network exposure, status, provisioning, contact, and isolation as described herein. The 5GNR RRC in RAN Node 511 interacts with NEF 553 in NFVI 550 to authenticate, obtain privileges, and execute the privileges. For example, the 5GNR RRC in RAN node 511 may obtain privileges for RAN exposure, RAN status distribution, UE status receipt, UE provisioning, and UE isolation.

Figure 8:
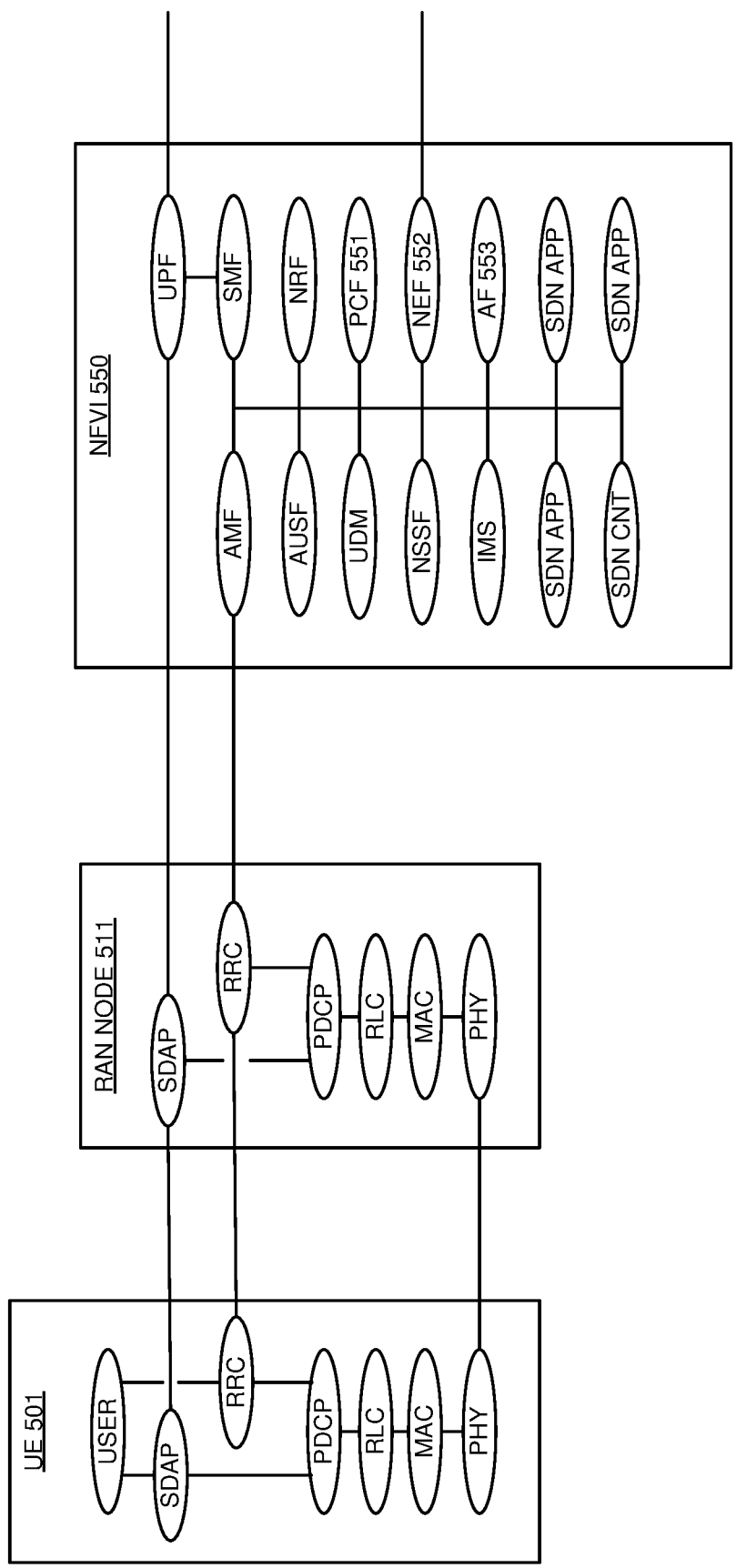
FIG. 8 illustrates the operation of the NFVI and RAN node to serve the UE with wireless communication services and indicate network status.

FIG. 8 illustrates the operation of NFVI 550 and RAN node 511 to serve UE 501 with wireless communication services and indicate network status. The RRC in UE 501 and the RRC in RAN node 511 exchange 5GNR RRC signaling over their respective PDCPs, RLCs, MACs, and PHYs. The RRC in RAN node 511 transfers 5GNR N2 signaling for UE 501 to the AMF in NFVI 550. The AMF receives the attachment signaling and exchanges N1 signaling with the RRC in UE 401 over RAN node 511 to perform UE authentication and UE security with the assistance of the AUSF and UDM. The AMF interacts with the SMF and PCF 533 to select default bearers and QoS. The AMF transfers response N2 signaling to the RRC in wireless access node 410 that indicates the network-selected bearers and QoS. The RRC in RAN node 511 receives the response signaling and configures its network applications to communicate with UE 501 and the UPF. The RRC in RAN node 511 signals the RRC in UE 501 over their respective PDCPs, RLCs, MACs, and PHYs to communicate with RAN node 511. In UE 501, the RRC configures its 5GNR network applications to communicate with RAN node 511. The RRC in RAN node 511 transfers N2 signaling to the AMF indicating UE acceptance, and the SMF directs the UPF to modify bearers that serve UE 501. The UPF exchanges user data for UE 501 between external systems and the SDAP in RAN node 511. The SDAP in RAN node 511 and the SDAP in UE 501 exchange this user data over their respective PDCPs, RLCs, MACs, and PHYs.

In NFVI 550, the VNFs hash their IDs and transfer the hashes to NEF 552. NEF 552 receives and decodes the VNF ID hashes to authenticate the VNFs. After VNF authentication, NEF 552 identifies privileges for the VNFs. NEF 552 hashes the selected privileges for the VNFs and transfers the status privilege hashes to the VNFs. The VNFs receive and decode their own privilege hashes to identify their VNF privileges. In UE 501 and RAN node 511, the RRCs hash their IDs and transfer the ID hashes to NEF 552. NEF 552 receives and decodes the ID hashes to authenticate UE 501 and RAN node 511. NEF 552 identifies privileges for UE 510 and RAN node 511. NEF 552 hashes the selected privileges for UE 501 and transfers the privilege hash to the RRC in UE 501. The RRC in UE 501 receives and decodes its privilege hash to identify its UE privileges. NEF 552 hashes the selected privileges for RAN node 511 and transfers the privilege hash to the RRC in RAN node 511. The RRC in RAN node 511 receives and decodes its privilege hash to identify its RAN privileges.

In response to a status privilege, the RRC in UE 501, the RRC in RAN node 511, and some of the VNFs in NFVI 550 select individual keys that characterize their individual status. The RRCs and VNFs hash their ID and status keys and transfer the ID hashes, status hashes, and RANDs to NEF 552. NEF 552 receives and decodes the ID hashes to authenticate UE 501, RAN node 511, and the VNFs in NFVI 550. NEF 552 receives and stores the status hashes. After authentication, NEF 552 identifies any additional privileges for the RRCs and VNFs. NEF 552 hashes and transfers any additional privileges to the appropriate the RRCs and VNFs. The RRCs and VNFs receive, decode, and use their additional privileges.

In particular, AF 553 obtains a status privilege for UE 501, RAN node 511, and some of the VNFs in NFVI 550. AF 553 hashes its own ID and status request hashes for UE 501, RAN node 511, and the VNFs and transfers the ID hash, status request hashes, and RANDs to NEF 552. NEF 552 receives and decodes the AF ID hash to authenticate AF 553. NEF 552 identifies new privileges for AF 553. NEF 553 hashes any new privileges and transfers the new privilege hash and RAND to AF 553. NEF 552 receives and decodes the status request hashes to identify the status requests. In response to the status requests, NEF 553 identifies the current status hashes and RANDs for UE 501, RAN node 511, and the VNFs in NFVI 550. NEF 552 transfers the current status hashes and RANDs to AF 553. AF 553 receives and decodes the current status hashes to discover and act on the current network status. AF 553 may use other privileges like provisioning, contact, and isolation.

Figure 9:
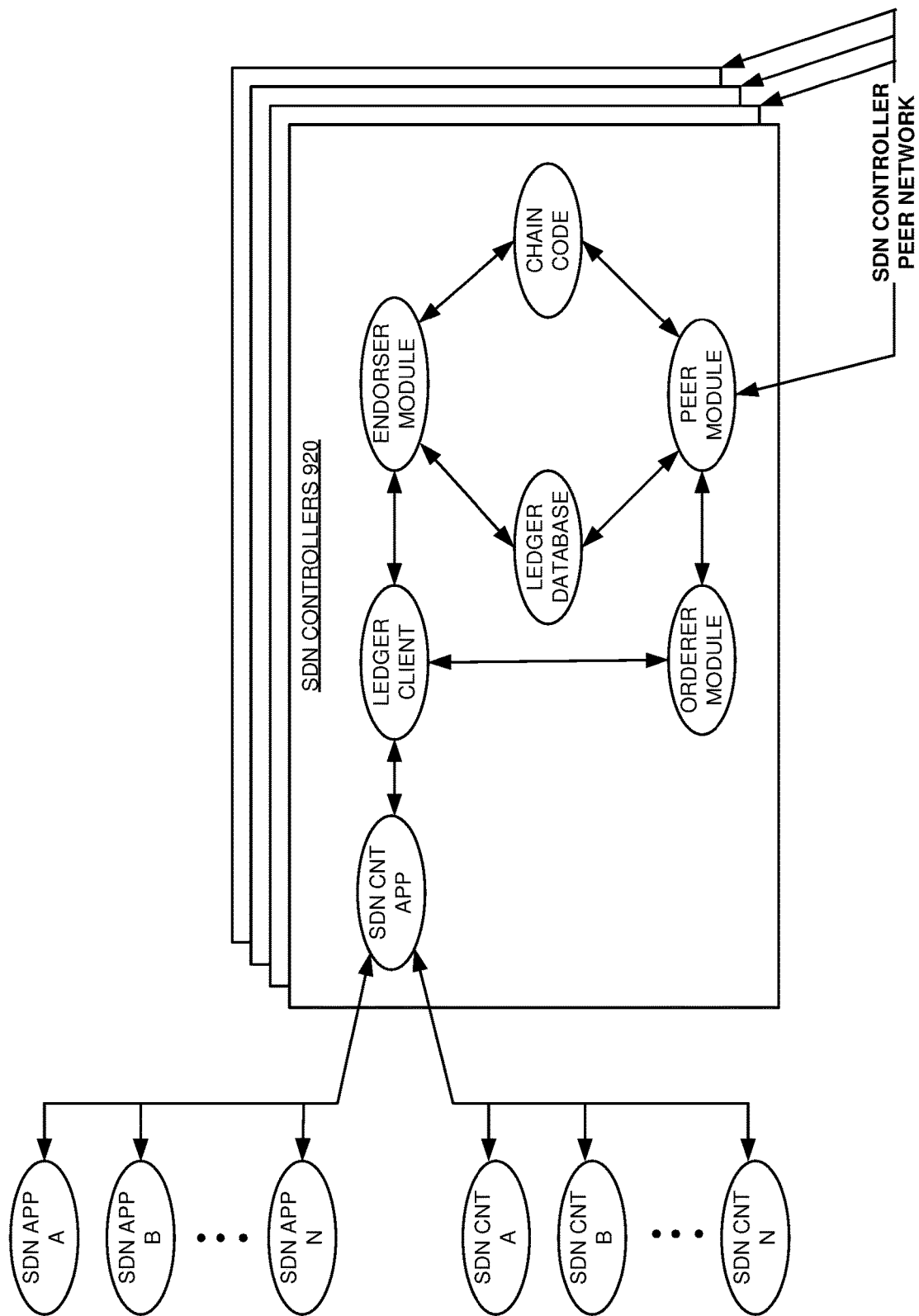
FIG. 9 illustrates a Software Define Network (SDN) controller to indicate SDN status.

FIG. 9 illustrates Software Define Network (SDN) controllers 920 to indicate SDN status. SDN controllers 920 are an example of NEF circuitry 120, although NEF circuitry 120 may differ. For clarity, only one of SDN controllers is fully depicted but the other SDN controllers 900 are configured and operate in a like manner. SDN controllers 920 comprises computer hardware like CPUs, NICs, memory, and bus circuitry. SDN controllers 920 comprises computer software like drivers, operating systems, virtual components, and applications. Each of SDN controllers 920 comprises an SDN controller application, ledger client, endorser module, orderer module, peer module, chain code, and ledger data base. The peer modules of SDN controllers 920 are coupled together over an SDN controller peer network. SDN controllers 920 are coupled to SDN applications A-N and SDN controllers A-N. SDN controllers 920, SDN applications A-N, and SDN controllers A-N are each configured with hash algorithms and IDs.

SDN applications A-N and SDN controllers A-N hash their IDs with RANDs and transfer the ID hashes and the RANDs to the SDN controller application in the depicted one of SDN controllers 920. The SDN controller application receives and decodes the ID hashes using the RANDs and hash algorithms. The SDN controller application authenticates SDN applications A-N and SDN controllers A-N by decoding their ID hashes and matching the IDs with expected values.

After authentication, SDN controller 900 transfers the SDN application IDs and the SDN controller IDs to the ledger client. The ledger client transfers the SDN application IDs and the SDN controller IDs to the endorser module in proposed transactions for SDN applications A-N and SDN controllers A-N. The chain code in SDN controllers 920 is configured with a data structure that correlates individual SDN applications A-N and individual SDN controllers A-N and their current status with SDN privileges like exposure, status, contact, provisioning, isolation, and the like. The endorser module executes the chain code to process the SDN application IDs, SDN controller IDs, and status through the data structure and translate the individual SDN application, controller IDs, and status into their correlated SDN privileges. The endorser module checks the chain code results (SDN privileges) against an endorsement rule set that has requirements, restrictions, and syntax which the chain code results must pass before endorsement. When the chain code result passes the endorsement rules, the endorser node transfers an individual transaction endorsement the ledger client.

In response to the transaction endorsements, the ledger client transfers the endorsed transactions to the orderer module. The orderer module hosts a data structure that correlates SDN applications A-N and SDN controllers A-N to peer modules in SDN controllers 920. The orderer transfers the endorsed transactions to the correlated peer modules over the SDN controller peer network. The peer modules execute the chain code to process the SDN application IDs and the SDN controller IDs through their data structures and translate the individual SDN application IDs, controller IDs, and status into their correlated SDN privileges. The peer modules share their chain code results and build a consensus for the chain code results—SDN privileges for SDN applications A-N and SDN controllers A-N). For example, peer modules that share the same chain code results would join a consensus for those results but not for different chain code results. When a consensus of peer modules is formed (like 70% of the peers), then the peer modules store the chain code results in their ledger databases using a blockchain format. The blockchain format stores data in blocks that include a hash of the previous block to form the blockchain. By using a large number of geo-diverse SDN controllers 920, the stored data is virtually immutable. At least one of the peer modules transfers the chain code results to the ledger client. The ledger client transfers the chain code results to the SDN controller application. The SDN controller application hashes the SDN privileges and transfers the privilege hashes and RANDs to SDN applications A-N and SDN controllers A-N. SDN applications A-N and SDN controllers A-N receive and decode their SDN privilege hashes to identify their SDN privileges.

Consider an example where SDN application B has a status exposure privilege. In response to the exposure privilege, SDN application B selects a status key like "service A at 70% and service B at 80%." SDN application B hashes its ID and the status key and transfers the ID hash, status hash, and RANDs to the SDN controller application in the depicted one of SDN controllers 920. The SDN controller application receives and decodes the ID hash to authenticate SDN application B. The SDN controller application receives and decodes the status hash to determine the current status of SDN application B. After authentication, the SDN controller application transfers the SDN application ID, the current status, the status hash, and the RAND to the ledger client. The ledger client transfers the SDN application ID and the current status to the endorser module in a proposed transaction for SDN application B. The endorser module executes the chain code to process the SDN application ID and current status through the data structure to yield SDN privileges or instructions. The endorser module checks the chain code results (SDN privileges) against the SDN endorsement rule set. The endorser node transfers an individual transaction endorsement to the ledger client. In response to the transaction endorsement, the ledger client transfers the endorsed transaction to the orderer module. The orderer module transfers the endorsed transaction to the peer modules. The peer modules execute the chain code to process the SDN application ID and current status through their data structures to translate the individual SDN application ID and status into SDN privileges. The peer modules share their chain code results and build a consensus for the chain code results—SDN privileges for SDN applications B. When a consensus of peer modules is formed, then the peer modules store the chain code results, the status hash, and the RAND. Note that a decoded version of the status is used to select privileges, but the decoded status is not stored on the blockchain—the status hash and RAND are stored. At least one of the peer modules transfers the chain code results (SDN privileges) to the ledger client. The ledger client transfers the chain code results to the SDN controller application. The SDN controller application hashes the SDN privileges and transfers the privilege hashes and RANDs to SDN application B. SDN applications B decodes and uses the SDN privileges.

Consider an example where SDN controller A has a status privilege for SDN application B. In response to the status privilege, SDN controller A hashes its ID and a status request for SDN application B and transfers the ID hash, status hash, and RANDs to the SDN controller application in the depicted one of SDN controllers 920. The SDN controller application receives and decodes the ID hash to authenticate SDN controller A. The SDN controller application receives and decodes the status request hash to identify the status request. After authentication, the SDN controller application transfers the SDN application ID and the status request to the ledger client. The ledger client transfers the SDN application ID and the status request to the endorser module in a proposed transaction for SDN controller A. The endorser module executes the chain code to process the SDN application ID and status request through the data structure to yield SDN privileges and/or instructions. In this example, the data structure yields the current status hash and RAND for SDN application B. The endorser module checks the chain code result against the SDN endorsement rule set to endorse the transaction. The endorser node transfers a transaction endorsement to the ledger client. In response to the transaction endorsement, the ledger client transfers the endorsed transaction to the orderer module. The orderer module transfers the endorsed transaction to the peer modules. The peer modules execute the chain code to process the SDN application ID and status request to identify the top-block status hash and RAND for SDN application B. The peer modules share their chain code result and build a consensus for the chain code result. When a consensus of peer modules is formed, then the peer modules store the chain code result. At least one of the peer modules transfers the chain code result to the ledger client. The ledger client transfers the chain code results to the SDN controller application. The SDN controller application hashes the SDN privileges and transfers the privilege hashes and RANDs to SDN controller A. The SDN controller transfers the current status hash and RAND for SDN application B to SDN controller A. SDN controller A decodes and uses the SDN privileges. SDN controller A decodes and uses the current status hash for SDN application B.

The wireless data network circuitry described above comprises computer hardware and software that form special-purpose wireless network circuitry to wirelessly serve UEs with wireless communication services and to indicate network status. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to wirelessly serve UEs with wireless communication services and indicate network status.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to indicate network status for a wireless data service delivered to User Equipment (UE) by the wireless communication network, the method comprising:
   Network Function (NF) circuitry determining an initial NF status and indicating the initial NF status to Network Exposure Function (NEF) circuitry;
   the NEF circuitry processing the initial NF status, and in response, determining an initial NF privilege based on the initial NF status and indicating the initial NF privilege to the NF circuitry;
   the NF circuitry delivering the wireless data service to the UE based on the initial NF privilege, determining a current NF status, and indicating the current NF status to the NEF circuitry;
   the NEF circuitry processing the current NF status, and in response, determining a current NF privilege based on the current NF status and indicating the current NF privilege to the NF circuitry; and
   the NF circuitry delivering the wireless data service to the UE based the current NF privilege.

2. The method of claim 1 further comprising:
   the NEF circuitry revoking the initial NF privilege based on the current NF status and indicating the revoked initial NF privilege to the NF circuitry; and wherein
   the NF circuitry delivering the wireless data service to the UE based the current NF privilege comprises delivering the wireless data service to the UE based the current NF privilege and not based on the initial NF privilege.

3. The method of claim 1 wherein:
   the NF circuitry determining the initial NF status and indicating the initial NF status to the NEF circuitry comprises determining an NF identity and indicating the NF identity to the NEF circuitry;
   the NEF circuitry processing the initial NF status, and in response, determining the initial NF privilege based on the initial NF status and indicating the initial NF privilege to the NF circuitry comprises the NEF circuitry processing the NF identity, and in response, authenticating the NF based on the NF identity and indicating the NF authentication to the NF circuitry; and
   the NF circuitry delivering the wireless data service to the UE based on the initial NF privilege comprises delivering the wireless data service to the UE based on the NF authentication.

4. The method of claim 1 wherein:
   the NEF circuitry determining the current NF privilege based on the current NF status comprises determining an NF exposure privilege based on the current NF status; and further comprising
   the NEF circuitry indicating the NF exposure privilege to an Application Function (AF), receiving an NF exposure request from the AF, and responsively exposing the NF to the wireless communication network.

5. The method of claim 1 wherein:
   the NEF circuitry determining the current NF privilege based on the current NF status comprises determining an NF isolation privilege based on the current NF status; and further comprising
   the NEF circuitry indicating the NF isolation privilege to an Application Function (AF), receiving an NF isolation request from the AF, and responsively stopping exposure of the NF to the wireless communication network.

6. The method of claim 1 wherein:
   the NEF circuitry determining the current NF privilege based on the current NF status comprises determining an NF provisioning privilege based on the current NF status; and further comprising
   the NEF circuitry indicating the NF provisioning privilege to an Application Function (AF), receiving an NF provisioning request from the AF, and responsively directing the wireless communication network to provision the NF per the NF provisioning request from the AF.

7. The method of claim 1 wherein the NF circuitry comprises a Session Management Function (SMF).

8. The method of claim 1 wherein the NF circuitry comprises a Policy Control Function (PCF).

9. The method of claim 1 wherein the NEF circuitry comprises a Network Slice Selection Function (NSSF).

10. The method of claim 1 wherein the NF circuitry comprises a Unified Data Management (UDM).

11. A wireless communication network to indicate network status for a wireless data service delivered to User Equipment (UE) by the wireless communication network, the wireless communication network comprising:
    Network Function (NF) circuitry configured to determine an initial NF status and indicate the initial NF status to Network Exposure Function (NEF) circuitry;
    the NEF circuitry configured to process the initial NF status, and in response, determine an initial NF privilege based on the initial NF status and indicate the initial NF privilege to the NF circuitry;
    the NF circuitry configured to deliver the wireless data service to the UE based on the initial NF privilege, determine a current NF status, and indicate the current NF status to the NEF circuitry;
    the NEF circuitry configured to process the current NF status, and in response, determine a current NF privilege based on the current NF status and indicate the current NF privilege to the NF circuitry; and
    the NF circuitry configured to deliver the wireless data service to the UE based the current NF privilege.

12. The wireless communication network of claim 11 further comprising:
the NEF circuitry configured to revoke the initial NF privilege based on the current NF status and indicate the revoked initial NF privilege to the NF circuitry; and wherein
the NF circuitry is configured to deliver the wireless data service to the UE based the current NF privilege and not based on the initial NF privilege.

13. The wireless communication network of claim 11 wherein:
the NF circuitry is configured to determine an NF identity and indicate the NF identity to the NEF circuitry;
the NEF circuitry is configured to process the NF identity, and in response, authenticate the NF based on the NF identity and indicate the NF authentication to the NF circuitry; and
the NF circuitry is configured to deliver the wireless data service to the UE based on the NF authentication.

14. The wireless communication network of claim 11 wherein:
the NEF circuitry is configured to determine an NF exposure privilege based on the current NF status; and further comprising
the NEF circuitry is configured to indicate the NF exposure privilege to an Application Function (AF), receive an NF exposure request from the AF, and responsively expose the NF to the wireless communication network.

15. The wireless communication network of claim 11 wherein:
the NEF circuitry is configured to determine an NF isolation privilege based on the current NF status; and further comprising
the NEF circuitry configured to indicate the NF isolation privilege to an Application Function (AF), receive an NF isolation request from the AF, and responsively stop exposure of the NF to the wireless communication network.

16. The wireless communication network of claim 11 wherein:
the NEF circuitry is configured to determine an NF provisioning privilege based on the current NF status; and further comprising
the NEF circuitry configured to indicate the NF provisioning privilege to an Application Function (AF), receive an NF provisioning request from the AF, and responsively direct the wireless communication network to provision the NF per the NF provisioning request from the AF.

17. The wireless communication network of claim 11 wherein the NF circuitry comprises a Session Management Function (SMF).

18. The wireless communication network of claim 11 wherein the NF circuitry comprises a Policy Control Function (PCF).

19. The wireless communication network of claim 11 circuitry comprises a Network Slice Selection Function (NSSF).

20. The wireless communication network of claim 11 wherein the NF circuitry comprises a Unified Data Management (UDM).

* * * * *